US011018945B2

(12) United States Patent
Lee et al.

(10) Patent No.: US 11,018,945 B2
(45) Date of Patent: May 25, 2021

(54) TELEMETRY AGGREGATION AND NETWORK AUTONOMIC SCALING

(71) Applicant: Futurewei Technologies, Inc., Plano, TX (US)

(72) Inventors: Young Lee, Plano, TX (US); James Guichard, Hollis, NH (US); Ricard Vilalta, Castelldefels (ES); Dhruv Dhody, Bangalore (IN); Satish Karunanithi, Bangalore (IN)

(73) Assignee: Futurewei Technologies, Inc., Plano, TX (US)

( * ) Notice: Subject to any disclaimer, the term of this patent is extended or adjusted under 35 U.S.C. 154(b) by 46 days.

(21) Appl. No.: 15/919,130

(22) Filed: Mar. 12, 2018

(65) Prior Publication Data
US 2018/0270118 A1 Sep. 20, 2018

Related U.S. Application Data

(60) Provisional application No. 62/470,642, filed on Mar. 13, 2017.

(51) Int. Cl.
*H04L 12/24* (2006.01)
*H04L 12/26* (2006.01)

(52) U.S. Cl.
CPC .......... *H04L 41/0896* (2013.01); *H04L 43/08* (2013.01); *H04L 43/062* (2013.01);
(Continued)

(58) Field of Classification Search
CPC ... H04L 41/0896; H04L 43/08; H04L 43/062; H04L 43/0892; H04L 43/087; H04L 43/0882; H04L 43/16
See application file for complete search history.

(56) References Cited

U.S. PATENT DOCUMENTS

2011/0219113 A1* 9/2011 Grewal .................. G06F 15/16
  709/224
2014/0036675 A1 2/2014 Wang et al.
(Continued)

FOREIGN PATENT DOCUMENTS

CN 101146039 A 3/2008
CN 101159671 A 4/2008
(Continued)

OTHER PUBLICATIONS

Callon, et al., "A Framework for Layer 3 Provider-Provisioned Virtual Private Networks (PPVPNs)," RFC 4110, Jul. 2005, 82 pages.

(Continued)

*Primary Examiner* — Walter J Divito
*Assistant Examiner* — Anthony Luo
(74) *Attorney, Agent, or Firm* — Conley Rose, P.C.

(57) ABSTRACT

A method implemented by a central controller is provided. The method includes receiving traffic monitoring information from a client, and sending a traffic monitor request to a network controller, the traffic monitor request requesting the network controller to monitor one or more traffic parameters based on the traffic monitoring information. The method further includes receiving a traffic report from the network controller, and responsive to determining that a monitored traffic parameter in the traffic report does not satisfy a condition specified by the traffic monitoring information, initiating a scaling operation based on data contained in the traffic report.

19 Claims, 25 Drawing Sheets

(52) U.S. Cl.
CPC ........ *H04L 43/087* (2013.01); *H04L 43/0829* (2013.01); *H04L 43/0882* (2013.01); *H04L 43/16* (2013.01)

(56) References Cited

U.S. PATENT DOCUMENTS

| | | | |
|---|---|---|---|
| 2015/0249608 A1 | 9/2015 | Zhang et al. | |
| 2016/0119189 A1* | 4/2016 | Choi | H04L 41/12 709/223 |
| 2017/0279684 A1* | 9/2017 | Khalil | H04L 41/0896 |
| 2018/0006948 A1* | 1/2018 | Torvi | H04L 41/0896 |
| 2018/0167825 A1* | 6/2018 | Egner | H04W 16/16 |
| 2018/0211541 A1* | 7/2018 | Rakah | G08G 1/096844 |

FOREIGN PATENT DOCUMENTS

| | | |
|---|---|---|
| CN | 101202700 A | 6/2008 |
| CN | 103095521 A | 5/2013 |

OTHER PUBLICATIONS

Bjorklund, Ed., "YANG—A Data Modeling Language for the Network Configuration Protocol (NETCONF)," RFC 6020, Oct. 2010, 173 pages.
Enns, Ed., et al., "Network Configuration Protocol (NETCONF)," RFC 6241, Jun. 2011, 113 pages.
Bierman, et al., "RESTCONF Protocol," RFC 8040, Jan. 2017, 137 pages.
Litkowski, et al., "YANG Data Model for L3VPN Service Delivery," RFC 8049, Feb. 2017, 157 pages.
Bogdanovic, et al., "YANG Module Classification," RFC 8199, Jul. 2017, 11 pages.
Dhody, et al., "Extensions to the Path Computation Element Communication Protocol (PCEP) to Compute Service-Aware Label Switched Paths (LSPs)," RFC 8233, Sep. 2017, 31 pages.
Litkowski, et al., "YANG Data Model for L3VPN service delivery," draft-ietf-l3sm-l3vpn-service-model-19, Nov. 4, 2016, 161 pages.
Ceccarelli, Ed., et al., "Framework for Abstraction and Control of Traffic Engineered Networks," draft-ietf-teas-actn-framework-04, Feb. 16, 2017, 35 pages.
Ceccarelli, Ed., et al., "Framework for Abstraction and Control of Traffic Engineered Networks," draft-ietf-teas-actn-framework-11, Oct. 27, 2017, 38 pages.
Saad, Ed., et al, "A YANG Data Model for Traffic Engineering Tunnels and Interfaces," draft-ietf-teas-yang-to-06, Mar. 10, 2017, 130 pages.
Saad, Ed., et al, "A YANG Data Model for Traffic Engineering Tunnels and Interfaces," draft-ietf-teas-yang-te-13, Mar. 3, 2018, 169 pages.
Liu, et al., "YANG Data Model for TE Topologies," draft-ietf-teas-yang-te-topo-07, Mar. 12, 2017, 119 pages.
Liu, et al., "YANG Data Model for TE Topologies," draft-ietf-teas-yang-te-topo-15, Feb. 22, 2018, 183 pages.
Lee, Ed., et al., "A Yang Data Model for ACTN VN Operation," draft-lee-teas-actn-vn-yang-03, Mar. 9, 2017, 25 pages.
Lee, Ed., et al., "A Yang Data Model for ACTN VN Operation," draft-lee-teas-actn-vn-yang-12, Feb. 27, 2018, 53 pages.
Wu, et al., "Service Models Explained," draft-wu-opsawg-service-model-explained-05, Jan. 5, 2017, 20 pages.
Wu, et al., "Service Models Explained," draft-wu-opsawg-service-model-explained-06, May 30, 2017, 21 pages.
Xu, et al., "Use Cases and Requirements of Dynamic Service Control based on Performance Monitoring in ACTN Architecture," draft-xu-actn-perf-dynamic-service-control-03.txt, Apr. 27, 2015, 10 pages.
Saad, Ed., et al., "A YANG Data Model for Traffic Engineering Tunnels and Interfaces," draft-ietf-teas-yang-te-14, Mar. 5, 2018, 169 pages.
Bogdanovic, et al., "YANG Module Classification," draft-ietf-netmod-yang-model-classification-04, Oct. 26, 2016, 11 pages.
Lee, Y., et al., "YANG models for ACTN TE KPI Telemetry," draft-lee-teas-actn-kpi-telemetry-00, May 16, 2018, 19 pages.
Machine Translation and Abstract of Chinese Publication No. CN101146039, Mar. 19, 2008, 13 pages.
Machine Translation and Abstract of Chinese Publication No. CN101159671, Apr. 9, 2008, 10 pages.
Machine Translation and Abstract of Chinese Publication No. CN101202700, Jun. 18, 2008, 16 pages.
Foreign Communication From a Counterpart Application, PCT Application No. PCT/CN2018/078870, English Translation of International Search Report dated May 31, 2018, 5 pages.
Foreign Communication From a Counterpart Application, PCT Application No. PCT/CN2018/078870, English Translation of Written Opinion dated May 31, 2018, 4 pages.

\* cited by examiner

```
module: ietf-actn-te-kpi-telemetry
augment /actn-vn:actn-state/actn-vn:actn-vn/vn-list/actn-vn:vn-member-list:
  +--ro vn-telemetry
     +--ro id?                          string
     +--ro one-way-delay?               uint32
     +--ro two-way-delay?               uint32
     +--ro one-way-delay-min?           uint32
     +--ro one-way-delay-max?           uint32
     +--ro two-way-delay-min?           uint32
     +--ro two-way-delay-max?           uint32
     +--ro one-way-delay-variation?     uint32
     +--ro two-way-delay-variation?     uint32
     +--ro one-way-packet-loss?         decimal64
     +--ro two-way-packet-loss?         decimal64
     +--ro utilized-bandwidth?          rt:bandwidth-ieee-float32
     +--ro te-ref?                      -> /te:te/tunnels/tunnel/name
     +--ro vn-ref?                      -> /actn-vn:actn/vn/vn-list/vn-id
     +--ro vn-member-ref?               -> /actn-vn:actn/vn/vn-list/vn-member-list/vn-member-id
     +--ro te-grouped-params*           -> /te:te/tunnels/tunnel/state/te-kpi:te-telemetry/id
     +--ro vn-grouped-params*           -> /actn-vn:actn-state/vn/vn-list/vn-member-list/vn-telemetry/id
     +--ro grouping-operation?          grouping-operation
```

```
module: ietf-actn-te-kpi-telemetry
augment /actn-vn:actn/actn-vn:vn/actn-vn:vn-list:
   +--rw vn-scaling-intent
      +--rw scale-in-intent
      |  +--rw threshold-time?                              uint32
      |  +--rw cooldown-time?                               uint32
      |  +--rw scale-in-operation-type?                     scaling-criteria-operation
      |  +--rw scale-out-operation-type?                    scaling-criteria-operation
      |  +--rw scaling-condition* [performance-type]
      |     +--rw performance-type                          identityref
      |     +--rw te-telemetry-tunnel-ref?                  -> /te:te/tunnels/tunnel/name
      +--rw scale-out-intent
         +--rw threshold-time?                              uint32
         +--rw cooldown-time?                               uint32
         +--rw scale-in-operation-type?                     scaling-criteria-operation
         +--rw scale-out-operation-type?                    scaling-criteria-operation
         +--rw scaling-condition* [performance-type]
            +--rw performance-type                          identityref
            +--rw te-telemetry-tunnel-ref?                  -> /te:te/tunnels/tunnel/name
```

```
module: ietf-te-kpi-telemetry
  augment /te:te/te:tunnels/te:tunnel/te:state:
    +--ro te-telemetry
      +--ro id?                            string
      +--ro one-way-delay?                 uint32
      +--ro two-way-delay?                 uint32
      +--ro one-way-delay-min?             uint32
      +--ro one-way-delay-max?             uint32
      +--ro two-way-delay-min?             uint32
      +--ro two-way-delay-max?             uint32
      +--ro one-way-delay-variation?       uint32
      +--ro two-way-delay-variation?       uint32
      +--ro one-way-packet-loss?           decimal64
      +--ro two-way-packet-loss?           decimal64
      +--ro utilized-bandwidth?            rt:bandwidth-ieee-float32
      +--ro te-ref?                        -> /te:te/tunnels/tunnel/name
  augment /te:te/te:tunnels/te:tunnel/te:config:
    +--rw te-scaling-intent
      +--rw scale-in-intent
      |  +--rw threshold-time?             uint32
      |  +--rw cooldown-time?              uint32
      |  +--rw scale-in-operation-type?    scaling-criteria-operation
      |  +--rw scale-out-operation-type?   scaling-criteria-operation
      |  +--rw scaling-condition* [performance-type]
      |     +--rw performance-type         identityref
      |     +--rw te-telemetry-tunnel-ref? -> /te:te/tunnels/tunnel/name
      +--rw scale-out-intent
        +--rw threshold-time?              uint32
        +--rw cooldown-time?               uint32
```

FIG. 6

A graphical representation of the complete data tree is presented here. The meaning of the symbols in these diagrams is as follows and as per [I-D.ietf-netmod-rfc6087bis]. Each node is printed as:
<status> <flags> <name> <opts> <type> <if-features>

<status> is one of:
     + for current
     x for deprecated
     o for obsolete <flags> is one of:
     rw for configuration data
     ro for non-configuration data
     -x for rpcs and actions
     -n for notifications <name> is the name of the node
     (<name>) means that the node is a choice node
     :(<name>) means that the node is a case node If the node is augmented into the tree from another module,
    its name is printed as <prefix>:<name>.

<opts> is one of:
     ? for an optional leaf, choice, anydata or anyxml
     ! for a presence container
     * for a leaf-list or list
     [<keys>] for a list's keys <type> is the name of the type for leafs and leaf-lists If the type is a leafref, the type is printed as "-> TARGET",
     where TARGET is either the leafref path, with prefixed removed
     if possible.

<if-features> is the list of features this node depends on,
     printed within curly brackets and a question mark "{...}?

The yang model tree for ietf-te-kpi-telemetry:
module: ietf-te-kpi-telemetry
 augment /te:te/te:tunnels/te:tunnel/te:state:
  +--ro te-telemetry
    +--ro one-way-delay?              uint32
    +--ro two-way-delay?              uint32
    +--ro one-way-delay-min?          uint32
    +--ro one-way-delay-max?          uint32
    +--ro two-way-delay-min?          uint32
    +--ro two-way-delay-max?          uint32
    +--ro one-way-delay-variation?    uint32

FROM FIG. 9A

```
    +--ro two-way-delay-variation?      uint32
    +--ro one-way-packet-loss?          decimal64
    +--ro two-way-packet-loss?          decimal64
    +--ro utilized-bandwidth?           tet:te-bandwidth
  augment /te:te/te:tunnels/te:tunnel/te:config:
    +--rw te-scaling-intent
      +--rw scale-in-intent
      | +--rw threshold-time?           uint32
      | +--rw cooldown-time?            uint32
      | +--rw operation-type?           scaling-criteria-operation
      | +--rw scaling-condition*        [performance-type]
      |   +--rw performance-type        identityref
      |   +--rw performance-value?      binary
      +--rw scale-out-intent
        +--rw threshold-time?           uint32
        +--rw cooldown-time?            uint32
        +--rw operation-type?           scaling-criteria-operation
        +--rw scaling-condition*        [performance-type]
          +--rw performance-type        identityref
          +--rw performance-value?      binary The yang model tree for ietf-actn-te-kpi-telemetry:
module: ietf-actn-te-kpi-telemetry
  augment /actn-vn:actn-state/actn-vn:vn/actn-vn:vn-list:
    +--ro vn-telemetry
      +--ro one-way-delay?              uint32
      +--ro two-way-delay?              uint32
      +--ro one-way-delay-min?          uint32
      +--ro one-way-delay-max?          uint32
      +--ro two-way-delay-min?          uint32
      +--ro two-way-delay-max?          uint32
      +--ro one-way-delay-variation?    uint32
      +--ro two-way-delay-variation?    uint32
      +--ro one-way-packet-loss?        decimal64
      +--ro two-way-packet-loss?        decimal64
      +--ro utilized-bandwidth?         tet:te-bandwidth
```

FROM FIG. 9B

FIG. 9C

```
augment /actn-vn:actn-state/actn-vn:vn/actn-vn:vn-list/actn-vn:vn-member-list:
  +--ro vn-telemetry
     +--ro one-way-delay?              uint32
     +--ro two-way-delay?              uint32
     +--ro one-way-delay-min?          uint32
     +--ro one-way-delay-max?          uint32
     +--ro two-way-delay-min?          uint32
     +--ro two-way-delay-max?          uint32
     +--ro one-way-delay-variation?    uint32
     +--ro two-way-delay-variation?    uint32
     +--ro one-way-packet-loss?        decimal64
     +--ro two-way-packet-loss?        decimal64
     +--ro utilized-bandwidth?         tet:te-bandwidth
augment /actn-vn:actn/actn-vn:vn/actn-vn:vn-list:
  +--rw vn-scaling-intent
     +--rw scale-in-intent
     |  +--rw threshold-time?          uint32
     |  +--rw cooldown-time?           uint32
     |  +--rw operation-type?          scaling-criteria-operation
     |  +--rw scaling-condition*       [performance-type]
     |  +--rw performance-type         identityref
     |  +--rw performance-value?       binary
     +--rw scale-out-intent
        +--rw threshold-time?          uint32
        +--rw cooldown-time?           uint32
        +--rw operation-type?          scaling-criteria-operation
        +--rw scaling-condition*       [performance-type]
           +--rw performance-type      identityref
           +--rw performance-value?    binary
```

The YANG code is as follows:
<CODE BEGINS> file "ietf-te-kpi-telemetry@2017-03-10.yang"
module ietf-te-kpi-telemetry { namespace "urn:ietf:params:xml:ns:yang:ietf-te-kpi-telemetry";

prefix "te-tel";

import ietf-te {
    prefix "te";
  } import ietf-routing-types {
    prefix "rt";
  } organization
    "IETF Traffic Engineering Architecture and Signaling (TEAS)
    Working Group";

contact
    "Editor: Young Lee <leeyoung@huawei.com>
    Editor: Dhruv Dhody <dhruv.ietf@gmail.com>
    Editor: Ricard Vilalta <ricard.vilalta@cttc.es>
    Editor: Satish Karunanithi <satish.karunanithi@gmail.com>";

description
    "This module describes telemetry for teas tunnel model";

revision 2017-03-10 {
    description
      "Initial revision. This YANG file defines
      the reusable base types for TE telemetry.";
    reference
      "Derived from earlier versions of base YANG files";
  }

/*
   *   Identities
   */ identity telemetry-param-type {

FROM FIG. 10A

```
    description
        "Base identity for telemetry param types";
} identity one-way-delay {
    base telemetry-param-type;
    description
        "To specify average Delay in one (forward) direction";
} identity two-way-delay {
    base telemetry-param-type;
    description
        "To specify average Delay in both (forward and reverse)
        directions";
} identity one-way-delay-variation {
    base telemetry-param-type;
    description
        "To specify average Delay Variation in one (forward) direction";
} identity two-way-delay-variation {
    base telemetry-param-type;
    description
        "To specify average Delay Variation in both (forward and reverse)
        directions";
} identity one-way-packet-loss {
    base telemetry-param-type;
    description
        "To specify packet loss in one (forward) direction.";
} identity two-way-packet-loss {
    base telemetry-param-type;
    description
        "To specify packet loss in in both (forward and reverse)
        directions";
```

FROM FIG. 10B

```
} identity utilized-bandwidth {
   base telemetry-param-type;
   description
      "To specify utilized bandwidth over the specified source
      and destination.";
}

/*
 *    Enums
 */
typedef scaling-criteria-operation {
   type enumeration {
      enum AND {
         description
           "AND operation";
      }
      enum OR {
        description
          "OR operation";
      }
   }
   description
     "Operations to analize list of scaling criterias";
}

/*
 *    Groupings
 */ grouping telemetry-delay {
  description
  "Base telemetry delay parameters";

leaf one-way-delay {
      type uint32;
      units "microseconds";
   description
```

FROM FIG. 10C

```
    "To specify average Delay in one (forward) direction
        during the measurement interval";
} leaf two-way-delay {
    type uint32;
    units "microseconds";
description
    "To specify average Delay in both (forward and reverse)
        directions during the measurement interval";
} leaf one-way-delay-min {
    type uint32;
    units "microseconds";
description
    "To specify minimum Delay in one (forward) direction
      during the measurement interval";
} leaf one-way-delay-max {
    type uint32;
    units "microseconds";
description
    "To specify maximum Delay in one (forward) direction
      during the measurement interval";
} leaf two-way-delay-min {
    type uint32;
    units "microseconds";
description
    "To specify minimum Delay in both (forward and reverse)
        directions during the measurement interval";
} leaf two-way-delay-max {
    type uint32;
    units "microseconds";
description
    "To specify maximum Delay in both (forward and reverse)
      directions during the measurement interval";
```

FROM FIG. 10D

```
    }

} grouping telemetry-delay-variance { description
  "Base telemetry delay variance parameters";
leaf one-way-delay-variation {
    type uint32;
    units "microseconds";
description
    "To specify average Delay Variation in one (forward)
    direction during the measurement interval";
} leaf two-way-delay-variation {
    type uint32;
    units "microseconds";
description
    "To specify average Delay Variation in both
    (forward and reverse) directions during the
        measurement interval";
}

} grouping telemetry-packet-loss { description
  "Base telemetry packet loss parameters";
leaf one-way-packet-loss {
    type decimal64 {
      fraction-digits 4;
      range "0.0000..100.0000";
    }
    units "percent";
description
    "To specify packet loss in one (forward) direction.";
}
```

FROM FIG. 10E

```
    leaf two-way-packet-loss {
      type decimal64 {
        fraction-digits 4;
        range "0.0000..100.0000";
      }
      units "percent";
    description
      "To specify packet loss in in both (forward and reverse)
        directions";
    }
  } grouping telemetry-bandwidth {
    description
    "Base telemetry bandwidth parameters";
    leaf utilized-bandwidth {
      type rt:bandwidth-ieee-float32;
    description
      "To specify utilized bandwidth over the specified source
        and destination in bytes per seconds.";
      reference
        "RFC 3471";
    }
  } grouping scaling-duration {
    description
      "Base scaling criteria durations";
    leaf threshold-time {
      type uint32;
      units "seconds";
      description
        "The duration for which the criteria must hold true";
    } leaf cooldown-time {
      type uint32;
      units "seconds";
      description
        "The duration after a scaling-in/scaling-out action has been
        triggered, for which there will be no further operation";
    }
```

FROM FIG. 10F

```
} grouping scaling-criteria {
  description
     "Grouping for scaling criteria";
  leaf performance-type {
    type identityref {
      base telemetry-param-type;
    }
      description
        "Reference to the tunnel level telemetry type";
  } leaf performance-value {
    type binary;
    description
      "value associated with the tunnel level telemetry type";
  }
} grouping scaling-intent {
  description
    "Basic sclaing intent";

uses scaling-duration;

leaf operation-type {
    type scaling-criteria-operation;
    description
      "Scaling operation type.";
  } list scaling-condition {
   key "performance-type";
   description
     "Scaling conditions";
   uses scaling-criteria;
  }

} grouping telemetry-param {
```

FROM FIG. 10G

```
  description
    "Base telemetry parameters";
    uses telemetry-delay;
    uses telemetry-delay-variance;
    uses telemetry-packet-loss;
    uses telemetry-bandwidth;
}

/*
 *      Augments
 */ augment "/te:te/te:tunnels/te:tunnel/te:state" { description
     "Augmentation parameters for state TE tunnel topologies.";

container te-telemetry {
    description
      "telemetry params";
    uses telemetry-param;
  }
} augment "/te:te/te:tunnels/te:tunnel/te:config" { description
     "Augmentation parameters for config scaling-criteria
     TE tunnel topologies. Scale in/out criteria might be used
     for network autonomics in order the controller
     to react to a certain set of monitored params.";

container te-scaling-intent {
    description
      "scaling intent";
```

FROM FIG. 10H

```
            container scale-in-intent {
                description
                    "scale-in";
                uses scaling-intent;
            }
            container scale-out-intent {
                description
                    "scale-out";
                uses scaling-intent;
            }
        }
    }
}

<CODE ENDS>
```

```
<CODE BEGINS> file ietf-actn-te-kpi-telemetry@2017-03-10.yang
module ietf-actn-te-kpi-telemetry { namespace "urn:ietf:params:xml:ns:yang:ietf-actn-te-kpi-telemetry";

prefix "actn-tel";

import ietf-actn-vn {
      prefix "actn-vn";
   } import ietf-te-kpi-telemetry {
      prefix "te-kpi";
   } organization
      "IETF Traffic Engineering Architecture and Signaling (TEAS)
      Working Group";

contact
      "Editor: Young Lee <leeyoung@huawei.com>
      Editor: Dhruv Dhody <dhruv.ietf@gmail.com>
      Editor: Ricard Vilalta <ricard.vilalta@cttc.es>
      Editor: Satish Karunanithi <satish.karunanithi@gmail.com>";

description
      "This module describes telemetry for actn vn model";

revision 2017-03-09 {
      description
         "Initial revision. This YANG file defines
         the ACTN VN telemetry.";
      reference
         "Derived from earlier versions of base YANG files";
   }

/*
    * Augments
    */
```

FROM FIG. 11A

```
augment "/actn-vn:actn-state/actn-vn:vn/actn-vn:vn-list" { description
    "Augmentation parameters for state TE VN topologies.";

container vn-telemetry {
    description
      "VN telemetry params";
    uses te-kpi:telemetry-param;
  }
}

/*
 *   VN-member augment
 */
augment "/actn-vn:actn-state/actn-vn:vn/actn-vn:vn-list/actn-vn:vn-member-list" {
  description
    "Augmentation parameters for state TE vn member topologies.";
  container vn-telemetry {
    description
      "VN telemetry params";
    uses te-kpi:telemetry-param;
  }
} augment "/actn-vn:actn/actn-vn:vn/actn-vn:vn-list" {
  description
    "Augmentation parameters for config TE VN topologies.
     Scale in/out criteria might be used for network autonomics
     in order the controller to react to a certain set
     of monitored params.";

container vn-scaling-intent {
    description
      "scaling intent";

container scale-in-intent {
      description
```

FROM FIG. 11B

```
            "VN scale-in";
        uses te-kpi:scaling-intent;
      }
      container scale-out-intent{
        description
            "VN scale-out";
        uses te-kpi:scaling-intent;
      }
    }
  }
}
```

\<CODE ENDS\>

```
<netconf:rpc netconf:message-id="101"
        xmlns:netconf="urn:ietf:params:xml:ns:netconf:base:1.0">
        <establish-subscription
                xmlns="urn:ietf:params:xml:ns:yang:ietf-yang-push:1.0">
                <filter netconf:type="subtree">
                        <te xmlns="urn:ietf:params:xml:ns:yang:ietf-te">
                                <tunnels>
                                        <tunnel>
                                                <name>Tunnel1</name>
                                                <identifier/>
                                                <state>
                                                        <te-telemetry xmlns="urn:ietf:params:xml:ns:yang:ietf-te-kpi-telemetry">
                                                                <utilized-bandwidth/>
                                                        </te-telemetry>
                                                </state>
                                        </tunnel>
                                </tunnels>
                        </te>
                </filter>
                <period>500</period>
                <encoding>encode-xml</encoding>
        </establish-subscription>
</netconf:rpc>
```

FIG. 12

```
<netconf:rpc netconf:message-id="101"
    xmlns:netconf="urn:ietf:params:xml:ns:netconf:base:1.0">
    <establish-subscription
        xmlns="urn:ietf:params:xml:ns:yang:ietf-yang-push:1.0">
        <filter netconf:type="subtree">
            <actn-state xmlns="urn:ietf:params:xml:ns:yang:ietf-actn-vn">
                <vn>
                    <vn-list>
                        <vn-id/>
                        <vn-name/>
                        <vn-telemetry xmlns="urn:ietf:params:xml:ns:yang:ietf-actn-te-kpi-telemetry">
                            <one-way-packet-loss/>
                            <utilized-bandwidth/>
                        </vn-telemetry >
                    </vn-list>
                </vn>
            </actn-state>
        </filter>
        <period>500</period>
    </establish-subscription>
</netconf:rpc>
```

FIG. 13

TELEMETRY AGGREGATION AND NETWORK AUTONOMIC SCALING

CROSS-REFERENCE TO RELATED APPLICATIONS

This patent application claims the benefit of U.S. Provisional Patent Application No. 62/470,642, filed Mar. 13, 2017, by Young Lee, et al., and titled "Telemetry Aggregation and Network Autonomic Scaling," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Abstraction and Control of Traffic Engineered (TE) Networks (ACTN) refers to a set of virtual network operations for controlling and managing large-scale multi-domain, multi-layer, and multi-vendor TE networks, so as to facilitate network programmability, automation, and efficient resource sharing. Various ACTN techniques may be employed for operating a network such as a Multiprotocol Label Switching (MPLS) TE (MPLS-TE) network or a transport layer (Layer 1/0) network, e.g., to provide connectivity and virtual network services for customers of the network. Services provided by the network may be tuned to meet certain requirements (e.g., traffic patterns, quality, reliability, etc.) of applications hosted by the network's customers. Moreover, data models (e.g., a representation of objects) may be used to configure or model a variety of network devices, protocol instances, and network services. For example, a YANG data model may describe how customers or end-to-end orchestrators can request and/or instantiate a generic virtual network service. Another YANG data model may describe a connection between certain YANG model classifications to ACTN interfaces. In particular, it may describe mapping a customer service model into the Customer Network Controller (CNC)—Multi-Domain Service Coordinator (MSDC) interface (CMI), where the customer service model may be known as the YANG model on the ACTN CMI.

SUMMARY

In one embodiment, the disclosure includes a method implemented by a central controller. The method includes receiving traffic monitoring information from a client; sending a traffic monitor request to a network controller, the traffic monitor request requesting the network controller to monitor one or more traffic parameters based on the traffic monitoring information; receiving a traffic report from the network controller; and responsive to determining that a monitored traffic parameter in the traffic report does not satisfy a condition specified by the traffic monitoring information, initiating a scaling operation based on data contained in the traffic report.

Optionally, in any of the preceding aspects, the traffic monitoring information may specify one or more telemetry parameters associated with at least one of a virtual network (VN) or a tunnel that part of the VN. Optionally, in any of the preceding aspects, the one or more telemetry parameters comprise at least one of utilized bandwidth, packet loss, packet delay, or jitter. Optionally, in any of the preceding aspects, determining that the monitored traffic parameter in the traffic report does not satisfy the condition comprises determining that the utilized bandwidth is such that bandwidth utilized by the VN or the tunnel exceeds a predetermined threshold. Optionally, in any of the preceding aspects, initiating the scaling operation comprises automatically requesting the network controller to increase bandwidth for the VN or the tunnel by a predetermined percentage. Optionally, in any of the preceding aspects, the central controller may comprise a multi-domain service coordinator (MSDC), wherein the client comprises a customer network controller (CNC), and wherein the network controller comprises at least one provisioning network controller (PNC). Optionally, in any of the preceding aspects, the method may further include sending a plurality of traffic monitor request to a plurality of provisioning network controllers (PNCs) in charge of a plurality of domains, respectively, receiving a plurality of traffic reports from the plurality of PNCs, respectively, and aggregating telemetry data from the plurality of traffic reports, the aggregated telemetry data comprising virtual network (VN) data and end-to-end traffic engineered (TE) data, where the VN data is associated with a VN extending across at least domains selected from the plurality of domains and wherein the end-to-end TE data is associated with tunnels that form part of the VN.

In another embodiment, the disclosure includes a central controller comprising a non-transitory memory storage comprising instructions, and one or more processors in communication with the memory. The one or more processors are configured to execute the instructions to: receive traffic monitoring information from a client; send a traffic monitor request to a network controller, the traffic monitor request requesting the network controller to monitor one or more traffic parameters based on the traffic monitoring information; receive a traffic report from the network controller; and responsive to determining that a monitored traffic parameter in the traffic report does not satisfy a condition specified by the traffic monitoring information, initiate a scaling operation based on data contained in the traffic report.

Optionally, in any of the preceding aspects, the traffic monitoring information specify one or more telemetry parameters associated with at least one of a virtual network (VN) or a tunnel that part of the VN. Optionally, in any of the preceding aspects, the one or more telemetry parameters comprise at least one of utilized bandwidth, packet loss, packet delay, or jitter. Optionally, in any of the preceding aspects, determining that the monitored traffic parameter in the traffic report does not satisfy the condition comprises determining that the utilized bandwidth is such that bandwidth utilized by the VN or the tunnel exceeds a predetermined threshold. Optionally, in any of the preceding aspects, initiating the scaling operation comprises automatically requesting the network controller to increase bandwidth for the VN or the tunnel by a predetermined percentage. Optionally, in any of the preceding aspects, the central controller comprises a multi-domain service coordinator (MSDC), wherein the client comprises a customer network controller (CNC), and wherein the network controller comprises at least one provisioning network controller (PNC). Optionally, in any of the preceding aspects, the one or more processors may further execute the instructions to: send a plurality of traffic monitor request to a plurality of provisioning network controllers (PNCs) in charge of a plurality of domains, respectively; receive a plurality of traffic reports from the plurality of PNCs, respectively; and aggregate telemetry data from the plurality of traffic reports, the aggregated telemetry data comprising virtual network (VN) data and end-to-end traffic engineered (TE) data, where the VN data is associated with a VN extending across at least domains selected from the plurality of domains and wherein the end-to-end TE data is associated with tunnels that form part of the VN.

In yet another embodiment, the disclosure includes non-transitory computer readable medium storing computer instructions, that when executed by one or more processors implemented in a central controller, cause the one or more processors to perform the steps of receiving traffic monitoring information from a client; sending a traffic monitor request to a network controller, the traffic monitor request requesting the network controller to monitor one or more traffic parameters based on the traffic monitoring information; receiving a traffic report from the network controller; and responsive to determining that a monitored traffic parameter in the traffic report does not satisfy a condition specified by the traffic monitoring information, initiating a scaling operation based on data contained in the traffic report.

Optionally, in any of the preceding aspects, the traffic monitoring information may specify one or more telemetry parameters associated with at least one of a virtual network (VN) or a tunnel that part of the VN. Optionally, in any of the preceding aspects, the one or more telemetry parameters comprise at least one of utilized bandwidth, packet loss, packet delay, or jitter. Optionally, in any of the preceding aspects, determining that the monitored traffic parameter in the traffic report does not satisfy the condition may comprise determining that the utilized bandwidth is such that bandwidth utilized by the VN or the tunnel exceeds a predetermined threshold. Optionally, in any of the preceding aspects, initiating the scaling operation may comprise automatically requesting the network controller to increase bandwidth for the VN or the tunnel by a predetermined percentage. Optionally, in any of the preceding aspects, the central controller comprises a multi-domain service coordinator (MSDC), wherein the client comprises a customer network controller (CNC), and wherein the network controller comprises at least one provisioning network controller (PNC).

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5A, 5B, and 6 depict diagrams of data models according to embodiments of the disclosure.

FIGS. 9-11 depict examples of YANG coding according to embodiments of the disclosure.

FIGS. 12 and 13 depict examples of schema for subscribing to notifications according to embodiments of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of telemetry-based data models that describe key performance indicator (KPI) data for traffic engineered (TE) tunnels and Abstraction and Control of TE Network (ACTN) virtual networks (VNs). The telemetry-based data models facilitate the aggregation and abstraction of performance telemetry data such as end-to-end (E2E) TE-tunnel level data and/or a Virtual Network level. In addition, the telemetry-based data models provide a mechanism for allowing clients to subscribe to key performance monitoring data and to define autonomic network scaling capabilities. Furthermore, one or more telemetry-based data models disclosed herein may augment existing data models to enhance data monitoring capabilities at the tunnel level and/or the VN level. These and other features are detailed below.

Figure 1:
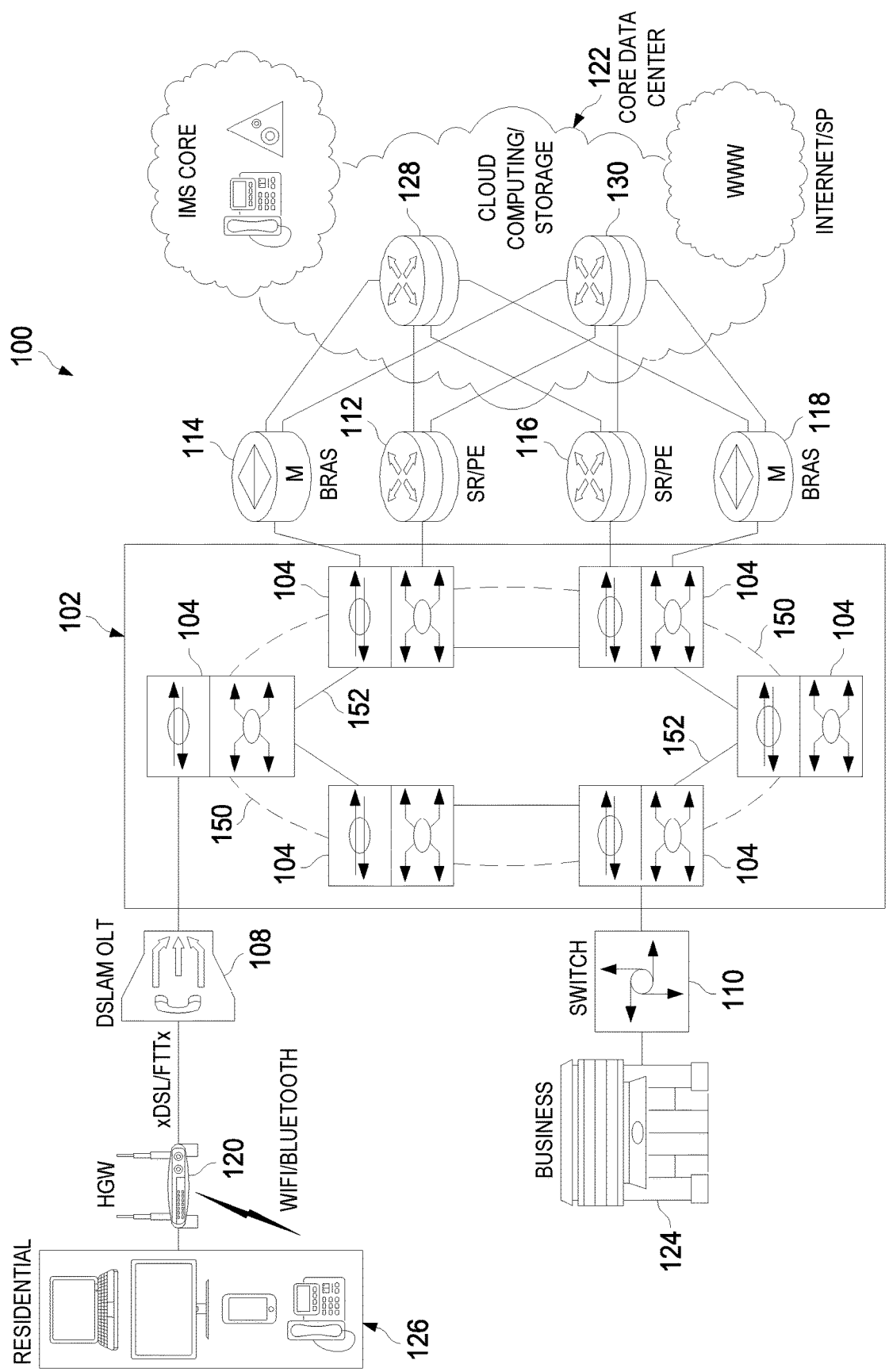
FIG. 1 is a diagram of a system comprising a communications network according to an embodiment of the disclosure.

FIG. 1 is a diagram of a system 100 comprising a communications network 102. The system 100 may be configured to support packet transport and transport services among network elements using the network 102. For example, the system 100 may transport data traffic for services between clients 124 and 126 and a service provider 122 (such as a core data center, for example). Examples of such services may include Internet service, virtual private network (VPN) services, value added service (VAS) services, Internet Protocol Television (IPTV) services, content delivery network (CDN) services, Internet of things (IoT) services, data analytics applications, and Internet Protocol Multimedia services. The system 100 may comprise a network 102, network elements 108, 110, 112, 114, 116, 118, 120, 128, and 130, service provider 122, and clients 124 and 126. The system 100 may be configured as shown or in any other suitable manner.

The network 102 may include a network infrastructure that comprises a plurality of integrated network nodes 104, and it may be configured to support transporting both optical data and packet switching data. Moreover, the network 102 may implement the network configurations to configure flow paths or virtual connections between client 124, client 126, and service provider 122 via the integrated network nodes 104. In some aspects, the network 102 may be a backbone network which connects a cloud computing system of the service provider 122 to clients 124 and 126. The network 102 may also connect a cloud computing system of the service provider 122 to other systems such as an external network or Internet, other cloud computing systems, data centers, and any other entity desiring access to the service provider 122.

The integrated network nodes 104 may comprise reconfigurable hybrid switches configured for packet switching and optical switching. In an embodiment, one or more integrated network nodes 104 may comprise at least one packet switch, optical data unit (ODU) cross-connect, and reconfigurable optical add-drop multiplex (ROADM), and/or router. The integrated network nodes 104 may be coupled to each other and to other network elements using virtual links 150 and physical links 152. For example, virtual links 150 may be logical paths between integrated network nodes 104 and physical links 152 may be optical fibers that form an optical wavelength division multiplexing (WDM) network topology. The integrated network nodes 104 may be coupled to each other using any suitable virtual links 150 or physical links 152 as would be appreciated by one of ordinary skill in the art upon viewing this disclosure. The integrated network nodes 104 may consider the network elements 108-120 as dummy terminals (DTs) that represent service and/or data traffic origination points and destination points.

Network elements 108-120, 128, and 130 may include clients, servers, broadband remote access servers (BRAS), switches, routers, service router/provider edge (SR/PE) routers, digital subscriber line access multiplexer (DSLAM) optical line terminal (OTL), gateways, home gateways (HGWs), service providers, PE network nodes, customers edge (CE) network nodes, an Internet Protocol (IP) router, and/or an IP multimedia subsystem (IMS) core. Clients 124 and 126 may include user devices in residential and business environments. For example, client 126 may reside in a residential environment and may communicate data with the network 102 via network elements 120 and 108, while client 124 may reside in a business environment and may communicate data with the network 102 via network element 110.

Examples of service provider 122 may include a network operator, a cloud provider, an Internet service provider, an IPTV service provider, an IMS core, a private network, an IoT service provider, a CDN, etc. In one embodiment, the service provider 122 may be a core data center that pools computing or storage resources to serve multiple clients 124 and 126 that request services from the service provider 122. For example, the service provider 122 may use a multi-tenant model where fine-grained resources may be dynamically assigned to a client specified implementation and reassigned to other implementations according to consumer demand. Moreover, the service provider 122 may automatically control and optimize resource use by leveraging a metering capability at some level of abstraction appropriate to the type of resource (e.g., storage, processing, bandwidth, and active user accounts).

In some implementations, the service provider 122 may include a cloud computing system configured to provide cloud-based services to requesting clients 124 and 126, e.g., via one or more models such as Service (IaaS) model, a Platform as a Service (PaaS) model, a Software as a Service (SaaS) model, etc. The cloud computing system, cloud computing, or cloud services may refer to a group of servers, storage elements, computers, laptops, cell phones, and/or any other types of network devices connected together by an IP network in order to share network resources (e.g., servers, processors, memory, applications, virtual machines, services, etc.) stored at one or more data centers of the service provider 122.

The service provider 122 may comprise a cloud infrastructure or platform managed as a large resource pool for multiple clusters, which may each include a cluster of hardware units or servers for data analytics and data monitoring. Data analytics may generally include the use of various computing models to evaluate raw data, while data monitoring may generally include monitoring traffic in the network 102 to facilitate automatic discovery of traffic imbalance and/or initiate network optimization procedures, thus helping the service provider 122 to use the network 102 efficiently and save capital expenditures/operating expenses. A large-scale platform typically demands many resources to effectively process and analyze large quantities of data such as "big data," which may range from a few terabytes (TBs) of data to many petabytes (PBs) of data or greater. Data analytics and performance monitoring may demand different types of resources, such as computing resources, networking resources, storage resources, and hardware resources, e.g., central processing units (CPUs), control boards, etc.

In some cases, the service provider 122 may provide services subject to service level agreement (SLA) requirements, such as service availability, latency, latency jitter, packet loss rate, bit error rate (BER), etc. A transport network may satisfy service availability and BER requirements by providing different protection and restoration mechanisms. However, there are no such mechanisms for satisfying other performance parameters. In order to provide high quality services according to customer SLAs, one possible solution may involve monitoring SLA-related performance parameters, and dynamically provisioning and optimizing services based on the performance monitoring results. Yet relatively large quantities of raw performance information may be generated as a result of monitoring such parameters, particularly in large-scale infrastructures such as previously discussed.

Figure 2:
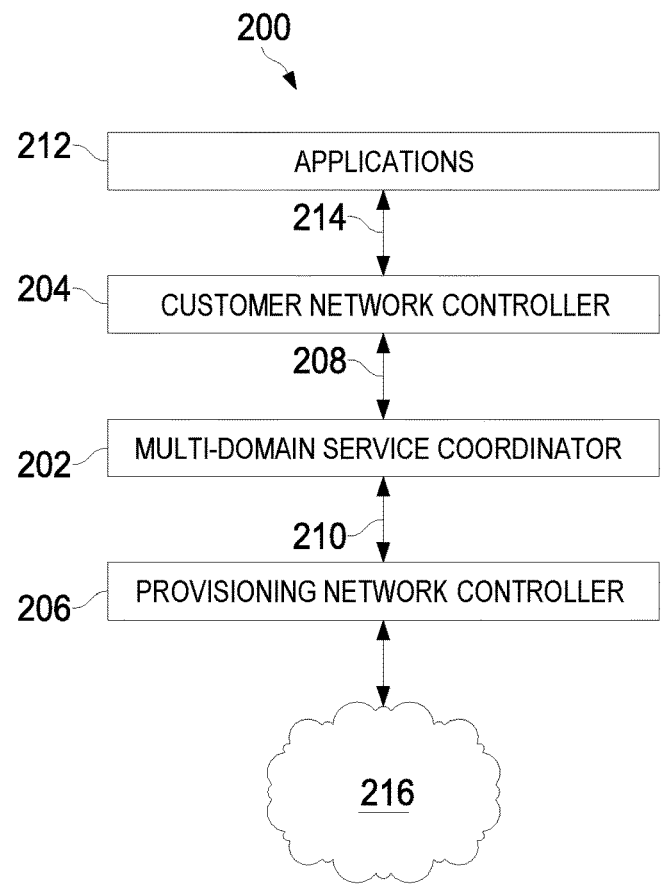
FIG. 2 is a diagram of an ACTN system according to an embodiment of the disclosure.

FIG. 2 depicts an ACTN system 200 according to an embodiment of the disclosure. In some implementations, the network 102 in FIG. 1 may serve as a backbone network to couple entities such as clients 124 and 126 and service provider 122 to the system 200. The system 200 comprises a software-defined networking (SDN) controller such as a multi-domain service coordinator (MDSC) 202, which may be configured to communicate with a Customer Network Controller (CNC) 204 and a provisioning Network Controllers (PNC) 206. For example, the CNC 204 may be communicatively coupled to the MDSC 202 via a CNC-MDSC Interface (CMI) 208, while the PNC 206 may be communicatively coupled to the MDSC 202 via a MDSC-PNC Interface (MPI) 210. Moreover, the CNC 204 may include or be coupled to one or more applications 212 via a northbound interface 214, which may be used to communicate application demand and requests for network resources, topology, or services. While FIG. 2 only depicts one CNC 204, PNC 206, and application 212, the ACTN system 200 may comprise a plurality of CNCs and/or PNCs in other implementations.

The MDSC 202 may be configured to perform various ACTN functionalities such as a multi-domain coordination function, a virtualization/abstraction function, a customer mapping function, and a virtual service coordination function. The multi-domain coordination function may involve overseeing specific aspects of different domains and building a single abstracted end-to-end network topology in order to coordinate end-to-end path computation and path/service provisioning. The virtualization/abstraction function may be used to provide an abstracted view of underlying network resources towards customers (e.g., CNC 204). It may include converting customer resource requests into virtual network paths based on the global network-wide abstracted topology and the creation of an abstracted view of network slices allocated to each customer. The customer mapping function may be performed to map customer VN setup commands into network provisioning requests to the PNC 206 according to a static or dynamic policy. The customer mapping function may also provide mapping and translation of customer virtual network slices into physical network resources. The virtual service coordination function may be used to incorporate customer service-related knowledge into virtual network operations in order to seamlessly operate virtual networks while meeting customer service requirements.

In general, information carried over the CMI 208 may relate to traffic monitoring and control strategy (e.g., service and/or traffic parameters to be monitored), while information carried over the MPI 210 may relate to traffic monitoring parameters and results. For example, the CNC 204 may use the CMI 208 to send the MDSC 202 requests for network resources or SLA-based services, while the MDSC 202 and the PNC 206 may use the MPI 210 to exchange communications associated with such requests. The PNC 206 is configured to manage a network 216, which may be substantially similar to the network 102 of FIG. 1. For example, the PNC 206 may be in charge of configuring network elements, monitoring the physical topology of the network 216 and passing it, either raw or abstracted, to the MDSC 202 via the MPI 210. The PNC 206 may also implement ACTN functions such as the multi-domain coordination and virtualization/abstraction functions described above. In some embodiments, the MDSC 202 and/or the PNC 206 may be implemented by a network provider substantially similar to the service provider 122 of FIG. 1. Moreover, the CNC 204 may comprise different types of customers or clients (e.g., clients 124 or 126) such as residential users, mobile users, enterprises, governments, utilities, etc.

Figure 3:
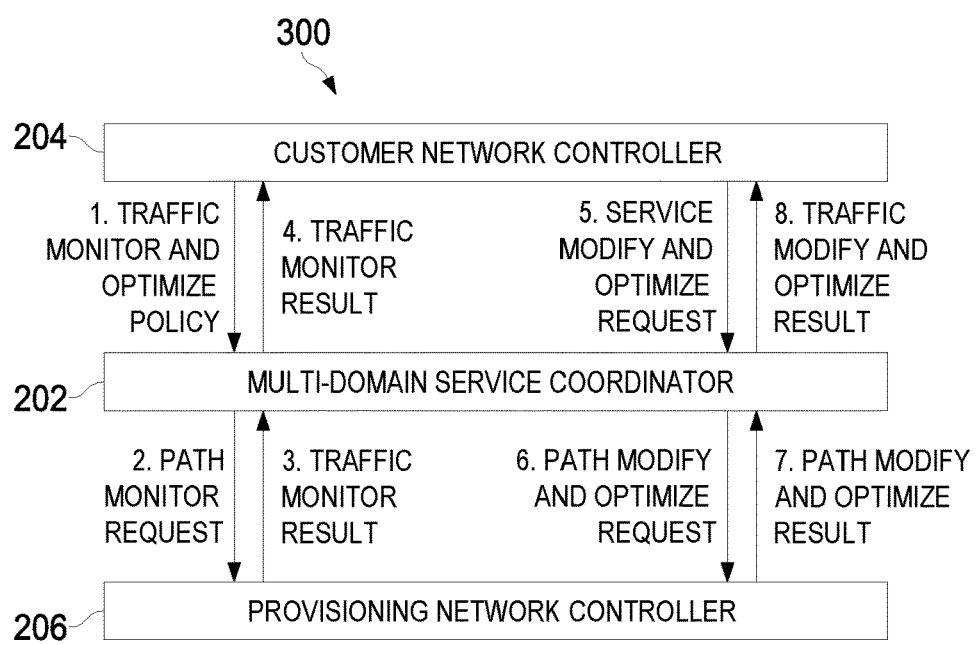
FIG. 3 is a flow diagram model according to an embodiment of the disclosure.

FIG. 3 depicts a flow diagram 300 for dynamic service control according to an embodiment of the disclosure. At step 1, the CNC 204 sends traffic monitoring and traffic optimization strategy information to the MDSC 202 (e.g., via CMI 208). For instance, such information may include SLA requirements (e.g., service availability, latency, latency jitter, packet loss rate, BER, etc.) so that the MDSC 202 may determine which performance parameters should be monitored and identify a service optimization strategy. At step 2, the MDSC 202 sends the corresponding path traffic monitoring request to the PNC 206 (e.g., via PMI 210). The request traffic monitoring from the MDSC 202 may include performance monitoring parameters such as delay, jitter, packet loss, bit error rate, monitoring cycle (e.g., 15 minutes or 24 hours), etc.

In turn, the PNC 206 begins performance monitoring in the underlying physical networks, collects the results of related path, and translates the performance results of the physical topology to the performance information of the abstract topology. The PNC 206 may collect performance results using any suitable protocols such as the Path Computation Element Protocol (PCEP) and/or databases, e.g., a Traffic Engineering Database (TED) and Label Switched Path Database (LSP-DB). At step 3, the PNC 206 may report the performance results to the MDSC 202. Based on the traffic optimization information obtained from the CNC 204 at step 1, the MDSC 202 determines whether the service should be adjusted (e.g., to meet SLA requirements such as packet delay), or if a new connection should be created. If so, the MDSC 202 sends the traffic monitoring results to the CNC 204 at step 4, e.g., to indicate to the CNC 204 that the service needs adjustment. The CNC 204 may then confirm whether the service can be optimized. If so, the CNC 204 sends a service adjustment request to the MDSC 202 at step 5. At step 6, the MDSC 202 may convert the service adjustment request into a path modification or creation request, which is then sent to the PNC 206 to complete the service optimization. At step 7, the PNC 206 may return the optimization results to the MDSC 202, which may then pass the optimization results to the CNC 204 at step 8.

Figure 4:
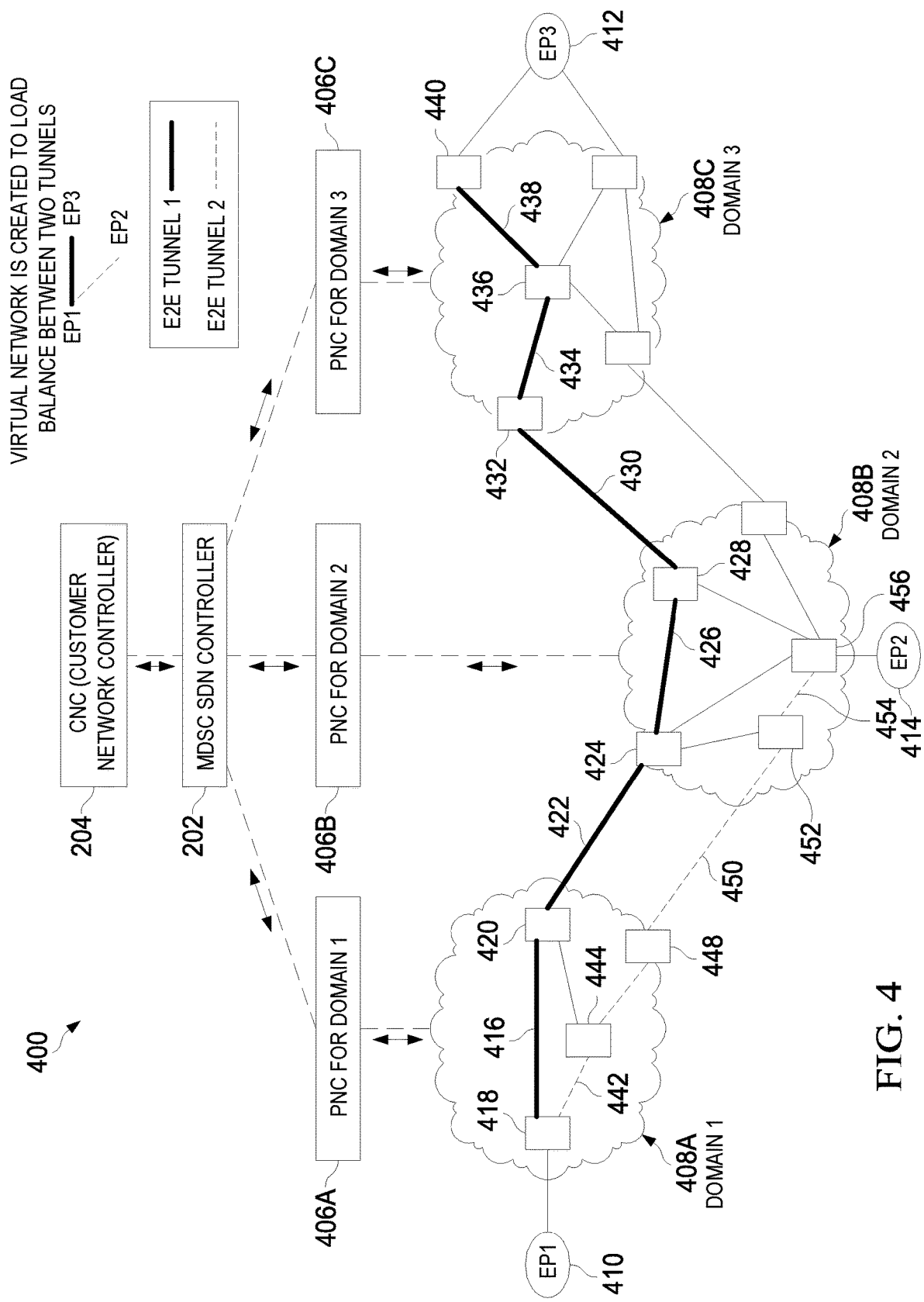
FIG. 4 is an ACTN system according to an embodiment of the disclosure.

FIG. 4 depicts an ACTN system 400 according to an embodiment of the disclosure. In some implementations, the network 102 in FIG. 1 may serve as a backbone network to couple entities to the system 400. The system 400 comprises the CNC 204, the MDSC 202, and a plurality of PNCs 406A, 406B, and 406C, which may be substantially similar to the PNC 206 in FIG. 2. The PNCs 406A, 406B, and 406C are configured to manage first, second, and third domains 408A, 408B, and 408C, respectively. The first, second, and third domains 408A, 408B, and 408C may generally be similar to the network 216 in FIG. 2.

The system 400 in FIG. 4 is based on an example in which a virtual network is created to balance load between two tunnels. The virtual network comprises a first tunnel established between a first endpoint 410 and a third endpoint 412, and a second tunnel established between the first endpoint 410 and a second endpoint 414. The first tunnel includes a first link 416 between node 418 and node 420; a second link 422 between node 420 and node 424; a third link 426 between node 424 and node 428; a fourth link 430 between node 428 and node 432; a fifth link 434 between node 432 and node 436; and a sixth link 438 between node 436 and node 440. The second tunnel includes a first link 442 between node 418 and node 444; a second link 446 between node 444 and node 448; a third link 450 between node 448 and node 452; and a fourth link 454 between node 452 and node 456.

Generally speaking, the CNC 404 may instantiate the virtual network using a YANG module such as described in the Internet Engineering Task Force (IETF) working document entitled, "A Yang Data Model for ACTN VN Operation" (hereinafter, the "ACTN VN Model"), which is incorporated herein in its entirety. The ACTN VN Model provides characteristics of Access Points (APs) that describe a customer's end point characteristics; characteristics of Virtual Network Access Points (VNAP) that describe how an AP is partitioned for multiple VNs sharing the AP and its reference to a Link Termination Point (LTP) of a Provider Edge (PE) Node; and characteristics of a customer's VNs in terms of VN Members (e.g., links 416, 422, 426, 430, 434, 438, 442, 446, 450, 454) comprising a VN, multi-source and/or multi-destination characteristics of VN Member, the VN's reference to TE-topology's Abstract Node.

Interfaces, tunnels, and Label Switched Paths (LSPs) associated with the virtual network in FIG. 4 may be defined using a YANG module such as described in the IETF working document entitled, A YANG Data Model for Traffic Engineering Tunnels and Interfaces" (hereinafter, the "TE-Tunnel Model"), which is incorporated herein in its entirety. The TE-Tunnel Model describes data models for TE Tunnels, LSPs and TE interfaces that cover data applicable to generic or device-independent, device-specific, Multiprotocol Label Switching (MPLS) technology specific, and Segment Routing (SR) TE technology.

As previously discussed with respect to FIG. 3, the CNC 204 may send traffic monitoring and optimization information to the MDSC 202, which may use such information to ensure that the PNCs 406A-406C monitor and report appropriate traffic parameters. The traffic monitoring and optimization information may comprise performance monitoring strategies, including traffic monitoring objects (e.g., services to be monitored), monitoring parameters (e.g., transmitted and received bytes per unit time), traffic monitoring cycles, traffic monitoring thresholds, Quality of Service (QoS) parameters, SLA requirements (e.g., BER, delay, jitter, packet loss rate, throughput, etc.), and the like. The traffic monitoring and optimization information may also comprise a policy that indicates if and when an existing service should be modified (e.g., upon traffic exceeding a threshold).

The MDSC 202 may use the traffic monitoring and optimization information to determine traffic information to be monitored by the PNCs 406A-406C and reported back to the MDSC 202. This way, traffic monitoring and optimization information may be used to monitor aggregated telemetry across all three domains 408A-408C, as E2E KPIs may differ from KPIs measured locally at each individual domain 408A, 408B, 408C.

In some aspects, the MDSC 202 may be configured to periodically send traffic monitoring results to the CNC 204. In other aspects, the MDSC 202 may be configured to send traffic monitoring results to the CNC 204 responsive to an event (e.g., if a measurement report from PNC 406A, 406B, or 406C indicates that traffic exceeds a threshold). Traffic monitoring results may include monitoring results of service performance, performance monitoring parameters, and indications of services that have been influenced. Traffic monitoring results may also include service optimization results based on performance. As previously mentioned, performance monitoring in a large-scale network can result in relatively large amounts of performance information being generated.

In an embodiment, one or more data models may be defined to aggregate telemetry data so as to reduce the overall amount of performance information exchanged within the system 400. One or more data models may also be defined to provide applications (e.g., applications 212) and/or clients (e.g., CRC 202) with a subscription mechanism for specifying autonomic network scaling capabilities. In some embodiments, such data models may be implemented with existing data models (e.g., the ACTN VN Model, the TE-Tunnel Model, etc.) so as to enhance ACTN interfaces such as the CMI and PMI.

FIGS. 5A and 5B depict a module 500 implementing an ACTN TE-Telemetry Model according to an embodiment of the disclosure. In some embodiments, the ACTN VN Model may be extended based on the disclosed ACTN TE-Telemetry Model to enhance VN monitoring capability, and thereby facilitate proactive re-optimization and reconfiguration of VNs based on the performance monitoring data collected via the ACTN VN Telemetry YANG model. Moreover, the ACTN TE-Telemetry Model may enable an autonomic TE scaling intent configuration mechanism on the VN level.

In general, a customer such as the CNC 204 (or application 212) may use the module 500 to specify Key Performance Indicator (KPI) telemetry data to which the customer subscribes. As shown in FIG. 5, for example, the module 500 may be used to indicate whether to monitor one-way delays from one endpoint to another endpoint (e.g., from EP1 to EP3) and/or two-way delays between two endpoints. If so, the CNC 204 may specify a minimum and/or maximum one-way delay; a minimum and/or maximum two-way delay; a one-way delay variation (e.g., the difference in end-to-end one-way delay in forward or reverse direction); and/or a two-way packet delay variation (e.g., average delay variation in forward and reverse directions). Moreover, the module 500 may also be used to indicate whether to monitor one-way packet loss (e.g., in one direction), two-way packet loss (e.g., in forward and reverse directions), and/or utilized bandwidth (e.g., bandwidth utilized over a specific source and destination).

In FIG. 5, "te-ref?" may refer to the name of a tunnel such as the first tunnel (e.g., Tunnel 1); "vn-ref?" may refer to an identifier identifying the virtual network associated with the tunnel; and "vn-member-ref?" may refer to a VN member (e.g., link 416) corresponding to the tunnel. As shown at the bottom of the module 500, one or more grouping operations may be performed in some embodiments. For example, the CNC 204 may use a grouping operation (e.g., AND, OR, MIN, MAX, etc.) to monitor multiple performance metrics.

In an embodiment, the module 500 may allow customers such as the CNC 204 to scaling criteria such that the MDSC 204 may automatically react to a certain set of variations in monitored parameters. For example, the CNC 204 may specify scaling criteria such that when a PNC (e.g., PNC 406A) sends the MDSC 202 traffic performance results indicating that bandwidth provisioned for a tunnel (e.g., tunnel 1) exceeds a threshold specified by the CNC 202, the MDSC 202 may automatically request the PNC to increase the total bandwidth for that tunnel by a certain amount such as a percentage of the bandwidth that was originally provisioned.

As shown in FIG. 5B, the module 500 may allow the CNC 204 to specify a threshold time before a scaling in or scaling out operation takes places. For instance, the threshold time may be such that the MDSC 202 is to wait a certain amount of time before initiating a scaling in or scaling out operation. The module 500 may also allow the CNC 204 to specify a cooldown time such that when a monitored parameter (e.g., bandwidth utilization or latency) meets a certain threshold specified by the CNC 204, the MDSC 202 is to wait a certain amount of time, e.g., to avoid frequent scaling in/out operations due to hysteresis. In some embodiments, the grouping operation in FIG. 5A may be employed to trigger scaling in/out operations according to the criteria set forth in FIG. 5B. For example, an AND operation may be used such that a scaling-in operation is triggered when at least two monitored parameters meet conditions specified by the CNC 204, e.g., if two-way delay in a VN exceeds a certain time (e.g., 50 milliseconds) and two-way packet loss in the VN exceeds a certain threshold (e.g., greater than one percent).

Summing up FIGS. 5A and 5B, the CNC 204 may use the module 500 (e.g., at step 1 in FIG. 3) to send the MDSC 202 traffic monitoring information such as a list of traffic parameters to be monitored at the TE level, as well as scaling criteria that set forth conditions for triggering scaling in/out operations. In turn, the MDSC 202 may request the PNCs 406A-406C (e.g., at step 2 in FIG. 3) to monitor traffic parameters based on the traffic monitoring information received from the CNC 204. For example, the traffic parameters to be monitored may include bandwidth utilization of links of a particular tunnel (e.g., tunnel 1) extending through all three domains 408A, 408B, and 408C. In some embodiments, traffic monitoring results from the PNCs 406A-406C may be automatically reported to the MDSC 202 in real-time so that accurate performance data may be readily available to the MDSC 202.

After receiving traffic monitoring results from the PNCs 406A-406C (e.g., at step 3 in FIG. 3), the MDSC 202 may aggregate the traffic results and calculate the bandwidth utilized by all links (e.g., links 416, 422, 426, 430, 434, and 438) for that particular tunnel. If the bandwidth utilized exceeds a threshold specified by the CNC 204, the MDSC 202 may automatically increase the tunnel's bandwidth by an amount/percentage specified by the CNC 204. In other words, the MDSC 202 may carry out the automatic increase without having to explicitly inform the CNC 204 (e.g., such as at step 4 in FIG. 3) or receive a separate request from the CNC 204 (e.g., such as at step 5 in FIG. 3). Nevertheless, while the MDSC 202 need not explicitly notify the CNC 202 that the bandwidth utilized exceeds the specified threshold, the interface between the MDSC 202 and CNC 204 may be such that traffic monitoring results from the PNCs 406A-406C may be automatically streamed to the CNC 204 or instantly available upon demand.

FIG. 6 depicts a module 600 implementing a TE KPI Model according to an embodiment of the disclosure. Generally speaking, the TE KPI Model provides similar functionality as the ACTN TE-Telemetry Model, except the TE KPI Model defines mechanisms for the aggregation/abstraction of performance telemetry data at the TE-tunnel level rather than the VN level. In an embodiment, the TE-Tunnel Model may be extended based on the disclosed TE KPI Model to enhance TE performance monitoring capability, and thereby facilitate proactive re-optimization and reconfiguration of TE tunnels or VNs based on the performance monitoring data collected via the disclosed TE KPI model. Moreover, the TE KPI Model may enable an autonomic TE scaling intent configuration mechanism on the TE-tunnel level.

Accordingly, the TE KPI and ACTN TE-Telemetry Models disclosed herein may be used to monitor one or more different types of telemetry data at both the TE-tunnel level (e.g., endpoint to endpoint) and the VN level (e.g., E2E tunnel 1 and ETE tunnel 2). In some embodiments, a data model representing a combination of the TE KPI Model and the ACTN TE-Telemetry Model may be provided.

Figure 7:
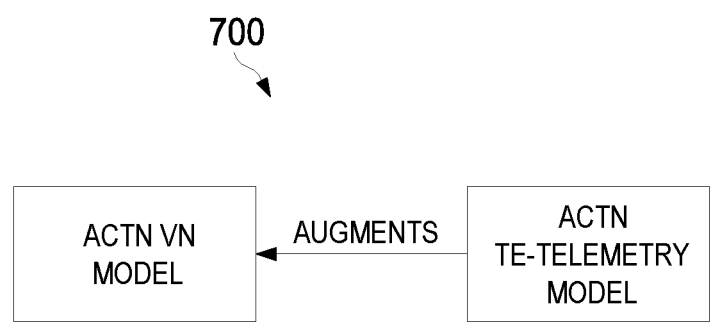
FIGS. 7 and 8 depict block diagrams of data models according to embodiments of the disclosure.

FIG. 7 depicts a block diagram 700 illustrating the relationship between the ACTN TE-Telemetry Model and the ACTN VN Model according to an embodiment of the disclosure. For example, the ACTN TE-Telemetry Model may augment the basic ACTN VN Model to enhance VN monitoring capabilities, such as previously discussed.

Figure 8:
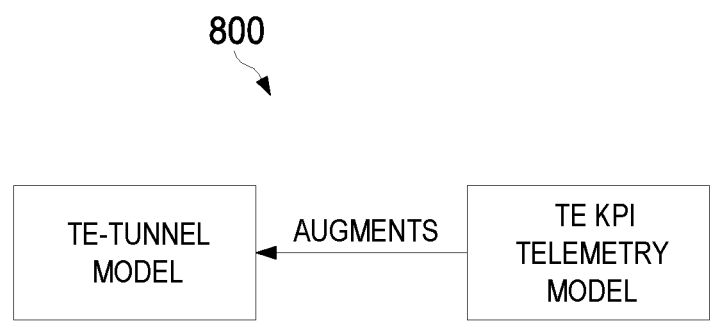

FIG. 8 depicts a block diagram 800 illustrating the relationship between the TE KPI Model and the TE-Tunnel Model according to an embodiment of the disclosure. For example, the TE KPI Model may augment the basic TE-Tunnel Model to enhance TE performance monitoring capabilities, such as previously discussed.

FIG. 9 depicts an example of a YANG Data Tree according to an embodiment of the disclosure, while FIGS. 10 and 11 depict examples of YANG coding for implementing the respective TE KPI Models and ACTN TE-Telemetry disclosed herein.

In some embodiments, notifications may be enabled in the disclosed embodiments using mechanisms such as described in IETF working documents entitled, "Subscribing to YANG datastore push updates" and "Subscribing to Event Notifications," both of which are incorporated herein in their entirety. For example, such mechanisms may be employed to subscribe to notifications on a per client (e.g., CNC 204) basis; specify subtree filters or xpath filters so that only interested contents will be sent; and specify either periodic or on-demand notifications.

FIG. 12 depicts an example of push subscription schema according to an embodiment of the disclosure. For example, the schema in FIG. 12 may be used by the CNC 204 to subscribe for telemetry information for a particular tunnel (e.g., E2E tunnel 1), where "utilized bandwidth" is the telemetry parameter that the CNC 204 is interested in having monitored in this example.

FIG. 13 depicts another example of push subscription schema according to an embodiment of the disclosure. For example, the schema in FIG. 13 may be used by the CNC 204 to subscribe for telemetry information for all VNs, where "one-way packet loss" and "utilized bandwidth" are the telemetry parameters that the CNC 204 is interested in having monitored in this example.

Figure 14:
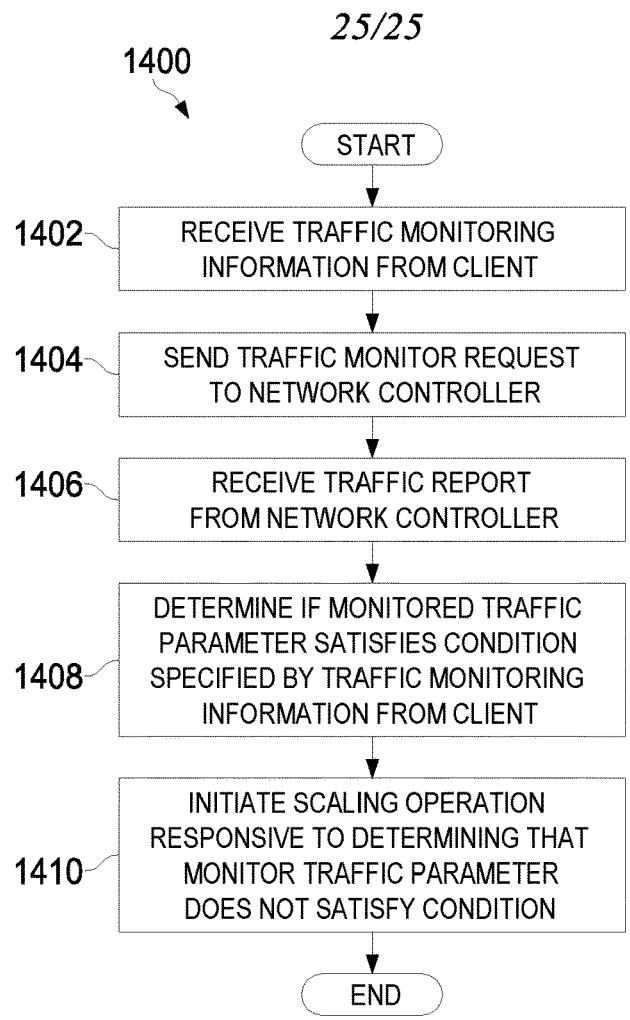
FIG. 14 depicts a flowchart of a method according to an embodiment of the disclosure.

FIG. 14 is a flowchart illustrating a method 1400 according to an embodiment of the disclosure. The operations may be performed in the order shown, or in a different order. Further, two or more of the operations may be performed concurrently instead of sequentially. The method 1400 commences at block 1402, where a central controller (e.g., MDSC 202) receives traffic monitoring information from a client (e.g., CNC 204 or application 212). At block 1404, the central controller may send a traffic monitor request to a network controller (e.g., PNC 206, PNC 406A, PNC 406B, or PNC 406C), where the traffic monitor request may request the network controller to monitor traffic parameters based on the traffic monitoring information received from the client. At block 1406, the central controller may receive a traffic report from the network controller. At block 1408, the central controller may determine whether traffic parameters in the traffic report satisfy at one or more conditions specified by the traffic monitoring information. At block 1410, the central controller may perform a scaling operation (e.g., scale resource up or down) responsive to determining that a traffic parameter does not satisfy a condition specified by the traffic monitoring information.

Figure 15:
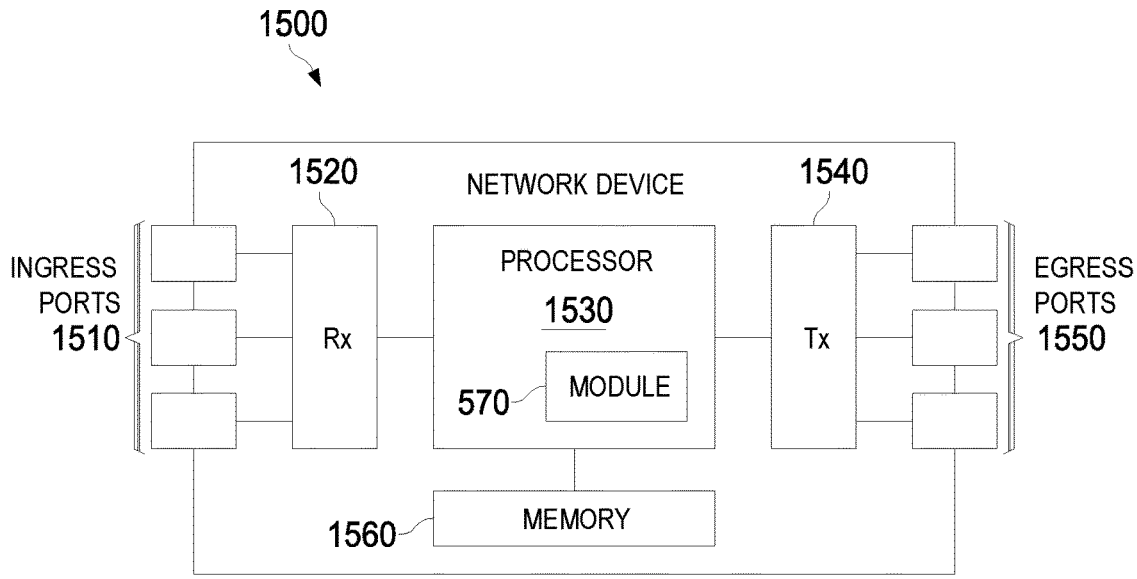
FIG. 15 is a diagram of a network device according to an embodiment of the disclosure.

FIG. 15 is a diagram of a network device 1500 according to an embodiment of the disclosure. The network device 1500 is suitable for implementing the disclosed embodiments as described herein. For example, the network device 1500 may include one or more components in the system 100 in FIG. 1, the system 200 in FIG. 2, and/or the system 400 in FIG. 4. The network device 1500 comprises one or more ingress ports 1510 and a receiver unit (Rx) 1520 for receiving data; at least one processor, microprocessor, logic unit, or central processing unit (CPU) 1530 to process the data; a transmitter unit (Tx) 1540 and one or more egress ports 1550 for transmitting the data; and a memory 1560 for storing the data. The network device 1500 may also comprise optical-to-electrical (OE) components and electrical-to-optical (EO) components coupled to the one or more ingress ports 1510, the receiver unit 1520, the transmitter unit 1540, and the one or more egress ports 1550 for egress or ingress of optical or electrical signals.

The at least one processor 1530 may be implemented by hardware and/or software. The at least one processor 1530 may be implemented as one or more CPU chips, cores (e.g., as a multi-core processor), field-programmable gate arrays (FPGAs), application specific integrated circuits (ASICs), or digital signal processors (DSPs). The at least one processor 1530 may be communicatively linked to the one or more ingress ports 1510, receiver unit 1520, transmitter unit 1540, one or more egress ports 1550, and/or memory 1560.

The at least one processor 1530 comprises a module 1570 configured to implement the embodiments disclosed herein, including method 1400. The inclusion of the module 1570 may therefore provide a substantial improvement to the functionality of the network device 1500 and effects a transformation of the network device 1500 to a different state. Alternatively, the module 1570 may be implemented as readable instructions stored in the memory 1560 and executable by the at least one processor 1530. The network device 1500 may include any other means for implementing the embodiments disclosed herein, including method 1400.

The memory 1560 comprises one or more disks, tape drives, or solid-state drives and may be used as an over-flow data storage device, to store programs when such programs are selected for execution, or to store instructions and data that are read during program execution. The memory 1560 may be volatile or non-volatile and may be read-only memory (ROM), random-access memory (RAM), ternary content-addressable memory (TCAM), or static random-access memory (SRAM).

In an embodiment, the network device 1500 comprises a central controller (e.g., MDSC 202) comprising a non-transitory memory storage 1560 storing instructions, and one or more processors 1530 in communication with the memory 1560. The one or more processors 1530 execute the instructions to perform one or more embodiments of the present disclosure.

In some embodiments, there is provided a method including means receiving traffic monitoring information from a client; means for sending a traffic monitor request to a network controller, the traffic monitor request requesting the network controller to monitor one or more traffic parameters based on the traffic monitoring information; means for receiving a traffic report from the network controller; and means for determining that a monitored traffic parameter in the traffic report does not satisfy a condition specified by the traffic monitoring information, and responsive thereto, means for initiating a scaling operation based on data contained in the traffic report.

In some embodiments, there is provided central controller comprising a non-transitory memory storage means comprising instructions, and one or more processor means in communication with the memory, the one or more processor means configured to execute the instructions to cause the processor means to receive traffic monitoring information from a client; send a traffic monitor request to a network controller, the traffic monitor request requesting the network controller to monitor one or more traffic parameters based on the traffic monitoring information; receive a traffic report from the network controller; and responsive to determining that a monitored traffic parameter in the traffic report does not satisfy a condition specified by the traffic monitoring information, initiate a scaling operation based on data contained in the traffic report.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a central controller in a packet data routing network, the method comprising:
   receiving, from a client network controller, network traffic monitoring information for a packet data routing network, the network traffic monitoring information including data concerning packet data traffic flow in the packet data routing network;
   sending a traffic monitor request to a network controller, the traffic monitor request requesting the network controller to monitor one or more traffic parameters based on the network traffic monitoring information;
   receiving a traffic report from the network controller;
   determining whether a monitored traffic parameter in the traffic report satisfies a condition specified by the network traffic monitoring information; and
   responsive to a determination that the monitored traffic parameter in the traffic report does not satisfy the condition specified by the network traffic monitoring information, initiating a scaling operation based on data contained in the traffic report, wherein the scaling operation comprises requesting the network controller to adjust bandwidth for a virtual network (VN) or a tunnel by a predetermined percentage to modify a rate of packet data flow in the VN or the tunnel.

2. The method of claim 1, wherein the network traffic monitoring information specifies one or more telemetry parameters associated with at least one of the VN or the tunnel that is part of the VN.

3. The method of claim 2, wherein the one or more telemetry parameters comprise at least one of utilized bandwidth, packet loss, packet delay, or jitter.

4. The method of claim 3, wherein determining whether the monitored traffic parameter in the traffic report satisfies the condition comprises determining whether the bandwidth utilized by the VN or the tunnel exceeds a predetermined threshold.

5. The method of claim 1, wherein the central controller comprises a multi-domain service coordinator (MSDC), the client network controller comprises a customer network controller (CNC), and the network controller comprises at least one provisioning network controller (PNC).

6. The method of claim 1, further comprising:
   sending a plurality of traffic monitor requests to a plurality of provisioning network controllers (PNCs) in charge of a plurality of domains, respectively;
   receiving a plurality of traffic reports from the plurality of PNCs, respectively; and
   aggregating telemetry data from the plurality of traffic reports, the aggregated telemetry data comprising VN data and end-to-end traffic engineered (TE) data, wherein the VN data is associated with a VN extending across at least domains selected from the plurality of domains and wherein the end-to-end TE data is associated with tunnels that form part of the VN.

7. A central controller in a packet data routing network, comprising:

a non-transitory memory storage comprising instructions; and one or more processors in communication with the memory, wherein the one or more processors execute the instructions to:

receive, from a client network controller, network traffic monitoring information for a packet data routing network, the network traffic monitoring information including data concerning packet data traffic flow in the packet data routing network;

send a traffic monitor request to a network controller, the traffic monitor request requesting the network controller to monitor one or more traffic parameters based on the network traffic monitoring information;

receive a traffic report from the network controller;

determine whether a monitored traffic parameter in the traffic report satisfies a condition specified by the network traffic monitoring information; and initiate a scaling operation based on data contained in the traffic report to adjust bandwidth for a virtual network (VN) or a tunnel by a predetermined percentage to modify a rate of packet data flow in the VN or the tunnel in response to a determination that the monitored traffic parameter in the traffic report does not satisfy the condition specified by the network traffic monitoring information.

8. The central controller of claim 7, wherein the network traffic monitoring information specify one or more telemetry parameters associated with at least one of a virtual network (VN) or a tunnel that is part of the VN.

9. The central controller of claim 8, wherein the one or more telemetry parameters comprise at least one of utilized bandwidth, packet loss, packet delay, or jitter.

10. The central controller of claim 9, wherein determining whether the monitored traffic parameter in the traffic report satisfies the condition comprises determining whether the bandwidth utilized by the VN or the tunnel exceeds a predetermined threshold.

11. The central controller of claim 10, wherein initiating the scaling operation comprises automatically requesting the network controller to increase bandwidth for the VN or the tunnel by a predetermined percentage.

12. The central controller of claim 7, wherein the central controller comprises a multi-domain service coordinator (MSDC), the client network controller comprises a customer network controller (CNC), and the network controller comprises at least one provisioning network controller (PNC).

13. The central controller of claim 7, wherein the one or more processors further execute the instructions to:

send a plurality of traffic monitor requests to a plurality of provisioning network controllers (PNCs) in charge of a plurality of domains, respectively;

receive a plurality of traffic reports from the plurality of PNCs, respectively; and aggregate telemetry data from the plurality of traffic reports, the aggregated telemetry data comprising virtual network (VN) data and end-to-end traffic engineered (TE) data, wherein the VN data is associated with a VN extending across at least domains selected from the plurality of domains and wherein the end-to-end TE data is associated with tunnels that form part of the VN.

14. A non-transitory computer readable medium storing computer instructions, that when executed by one or more processors implemented in a central controller in a packet data routing network, cause the one or more processors to perform the steps of:

receiving, from a client network controller, network traffic monitoring information for a packet data routing network, the network traffic monitoring information including data concerning packet data traffic flow in the packet data routing network;

sending a traffic monitor request to a network controller, the traffic monitor request requesting the network controller to monitor one or more traffic parameters based on the network traffic monitoring information;

receiving a traffic report from the network controller;

determining whether a monitored traffic parameter in the traffic report satisfies a condition specified by the network traffic monitoring information; and initiating a scaling operation based on data contained in the traffic report to adjust bandwidth for a virtual network (VN) or a tunnel by a predetermined percentage to modify a rate of packet data flow in the VN or the tunnel in response to a determination that the monitored traffic parameter in the traffic report does not satisfy the condition specified by the network traffic monitoring information.

15. The non-transitory computer readable medium of claim 14, wherein the network traffic monitoring information specify one or more telemetry parameters associated with at least one of a virtual network (VN) or a tunnel that is part of the VN.

16. The non-transitory computer readable medium of claim 15, wherein the one or more telemetry parameters comprise at least one of utilized bandwidth, packet loss, packet delay, or jitter.

17. The non-transitory computer readable medium of claim 16, wherein determining whether the monitored traffic parameter in the traffic report satisfies the condition comprises determining whether the bandwidth utilized by the VN or the tunnel exceeds a predetermined threshold.

18. The non-transitory computer readable medium of claim 17, wherein initiating the scaling operation comprises automatically requesting the network controller to increase bandwidth for the VN or the tunnel by a predetermined percentage.

19. The non-transitory computer readable medium of claim 14, wherein the central controller comprises a multi-domain service coordinator (MSDC), the client network controller comprises a customer network controller (CNC), and the network controller comprises at least one provisioning network controller (PNC).

* * * * *

UNITED STATES PATENT AND TRADEMARK OFFICE
CERTIFICATE OF CORRECTION

PATENT NO. : 11,018,945 B2
APPLICATION NO. : 15/919130
DATED : May 25, 2021
INVENTOR(S) : Young Lee et al.

Page 1 of 1

It is certified that error appears in the above-identified patent and that said Letters Patent is hereby corrected as shown below:

On the Title Page

Page 2, Column 2, replace Lines 4-6 with the following:
Saad, Ed., et al, "A YANG Data Model for Traffic Engineering Tunnels and Interfaces,"
draft-ietf-teas-yang-te-06, Mar. 10, 2017, 130 pages Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*